United States Patent [19]
Barnes et al.

[11] Patent Number: 5,320,381
[45] Date of Patent: Jun. 14, 1994

[54] AIR BAG DEPLOYMENT DOOR HINGE

[75] Inventors: William J. Barnes, Waterford; Joseph P. Spica, Novi; Gerald N. Schmidt, Milford, all of Mich.

[73] Assignee: General Motors Corporation, Detroit, Mich.

[21] Appl. No.: 84,992

[22] Filed: Jul. 2, 1993

[51] Int. Cl.$^5$ .............................................. B60R 21/16
[52] U.S. Cl. ................................. 280/728 B; 280/732
[58] Field of Search ................ 280/728 B, 732, 728 R

[56] References Cited

U.S. PATENT DOCUMENTS 5,135,255 8/1992 Heuseler et al. ................ 280/728 B
5,195,776 3/1993 Sakakida et al. ................ 280/728 B

FOREIGN PATENT DOCUMENTS 3605623 8/1987 Fed. Rep. of Germany ... 280/728 B
3743415 6/1988 Fed. Rep. of Germany ... 280/728 B
0227753 10/1991 Japan .............................. 280/728 B Primary Examiner—Margaret A. Focarino
Assistant Examiner—Christopher P. Ellis
Attorney, Agent, or Firm—Charles E. Leahy

[57] ABSTRACT

According to the invention a vehicle has a panel with an opening through which an air bag is deployed. An air bag deployment door closes the opening in the panel. Upon air bag deployment, the door is forcibly moved out of the opening from a closed position towards an open position by the deploying air bag. A hinge for the deployment door includes a door hinge element carried by the door, and a vehicle hinge element carried by the vehicle. The separate hinge elements have cooperating hinge-forming features which are spaced apart from one another when the door is in the closed position. Upon air bag deployment, the door begins to lift out of the opening and carries the door hinge element into engagement with the vehicle hinge element to hingedly interconnect the cooperating hinge-forming features, thereby anchoring the door to the vehicle and limiting further movement of the door to rotation about an axis defined by the hinge elements. In accordance with this invention, one of the hinge elements may include a hooked leg while the other hinge element may include an apertured leg. The hook and aperture provide cooperating hinge-forming features that form a hinged interconnection upon air bag deployment.

3 Claims, 4 Drawing Sheets

AIR BAG DEPLOYMENT DOOR HINGE

The invention relates to a hinge for an air bag deployment door in an instrument panel cover and more particularly to an improved hinge that extends between the door and vehicle structure to anchor the door to the vehicle during air bag deployment without requiring access underneath the instrument panel cover to fasten the hinge to the vehicle structure during installation into the vehicle.

BACKGROUND OF THE INVENTION

It is well known in motor vehicles to have an instrument panel assembly which consists of an instrument panel cover attached to rigid underlying vehicle structure. It is also well known to mount an air bag to the underlying vehicle structure for deployment through an air bag deployment opening provided in the instrument panel cover. The opening in the instrument panel cover is conventionally closed by an air bag deployment door secured in a closed position to conceal the undeployed air bag from view. The door is hingedly mounted so that the deploying air bag forcibly moves the door out of the opening from the closed position towards an open position to permit the deployment of the air bag through the opening. It is known in the prior art that the hinge for the deployment door may be a flexible or elastic strap, or a metal strap.

In some cases, the deployment door hinge extends between the deployment door and the instrument panel cover. Thus, the instrument panel cover provides support for the hinge to anchor the door to the vehicle during air bag deployment. This arrangement is convenient since the hinge can be sub-assembled and fastened to the instrument panel cover and deployment door before installation of the instrument panel cover into the vehicle.

In other cases, it is desirable for the hinge to extend between the deployment door and the more rigid vehicle structure underlying the instrument panel cover to anchor the door to the vehicle during air bag deployment. However, a disadvantage of this arrangement is that access is required underneath the instrument panel cover during installation into the vehicle to fasten the hinge to the vehicle structure.

Thus, it would be desirable to provide a new and improved hinge which would extend between the deployment door and vehicle structure to anchor the door to the vehicle during air bag deployment without requiring access underneath the instrument panel cover to fasten the hinge to the vehicle structure during installation into the vehicle.

SUMMARY OF THE INVENTION

According to the invention a vehicle has a cover with an opening through which an air bag is deployed. An air bag deployment door closes the opening in the cover. Upon air bag deployment, the door is forcibly moved out of the opening from a closed position towards an open position by the deploying air bag. A hinge for the deployment door includes a door hinge element carried by the door, and a vehicle hinge element carried by the vehicle. The separate hinge elements have cooperating hinge-forming features which are spaced apart from one another when the door is in the closed position. Upon air bag deployment, the door begins to lift out of the opening and carries the door hinge element into engagement with the vehicle hinge element to hingedly interconnect the cooperating hinge-forming features, thereby anchoring the door to the vehicle and limiting further movement of the door to rotation about an axis defined by the hinge elements.

In accordance with another aspect of this invention, one of the hinge elements may include a hooked leg while the other hinge element may include an apertured leg. The hook and aperture provide cooperating hinge-forming features that form a hinged interconnection upon air bag deployment.

Accordingly, it is an object, feature and advantage of this invention to provide a hinge for an air bag deployment door which makes a hinged interconnection extending between the deployment door and vehicle structure to anchor the door to the vehicle during air bag deployment without requiring access underneath the instrument panel cover to fasten the hinge to the vehicle structure during installation into the vehicle.

Another object of this invention is to provide a hinge that allows for sub-assembly of the instrument panel cover, deployment door, and hinge without requiring subsequent access underneath the instrument panel cover to fasten the hinge to the vehicle structure during installation into the vehicle.

BRIEF DESCRIPTION OF THE DRAWINGS

These and other features and objects of the present invention will become apparent upon consideration of the following description of the preferred embodiment and accompanying drawings in which.

DESCRIPTION OF THE PREFERRED EMBODIMENT

Figure 1:
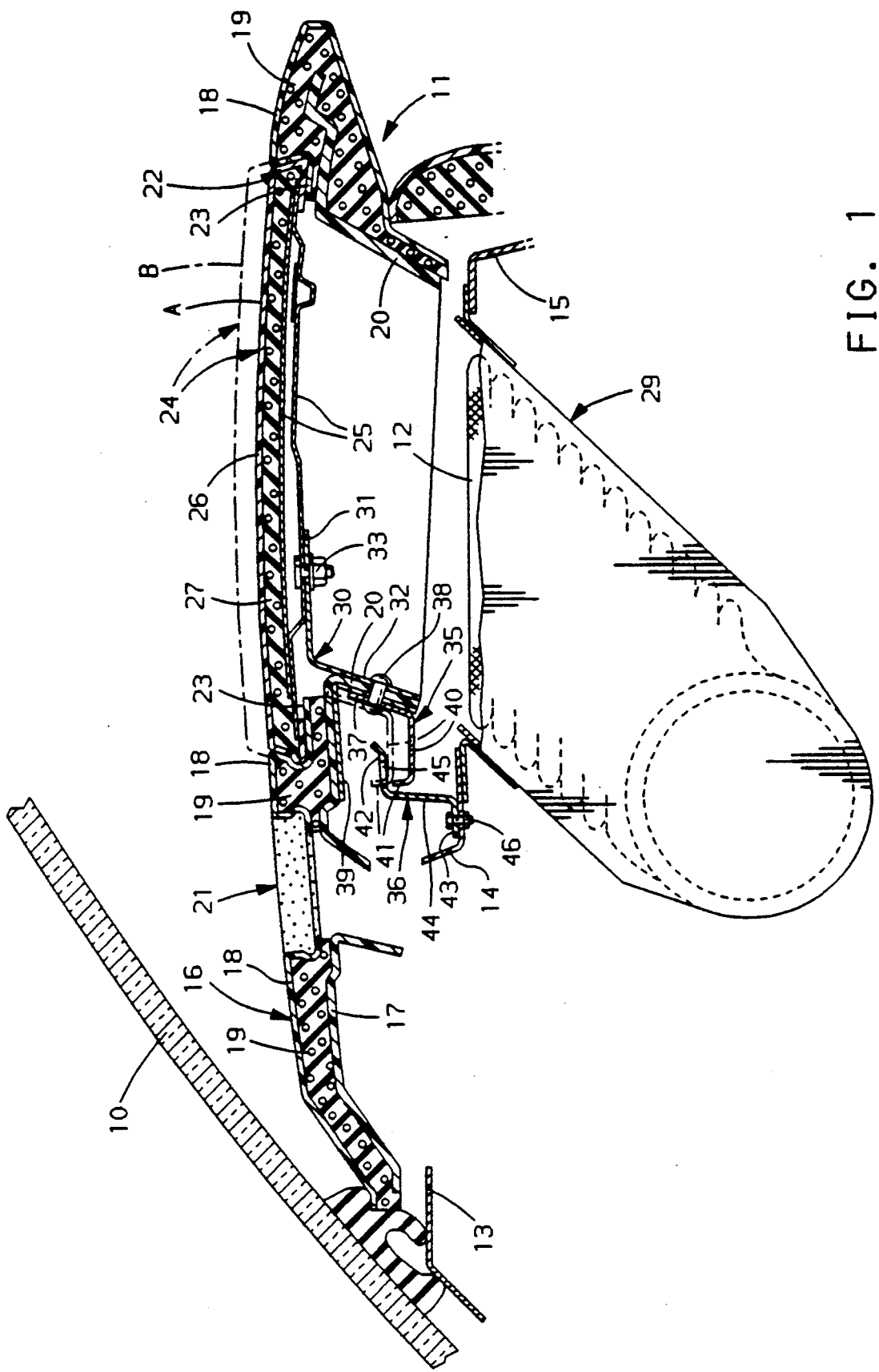
FIG. 1 is a section view through a vehicle instrument panel assembly showing the air bag in the undeployed position, the door in the closed position covering the air bag deployment opening, and the hinge elements in the spaced apart position.
Figures 3, 4:
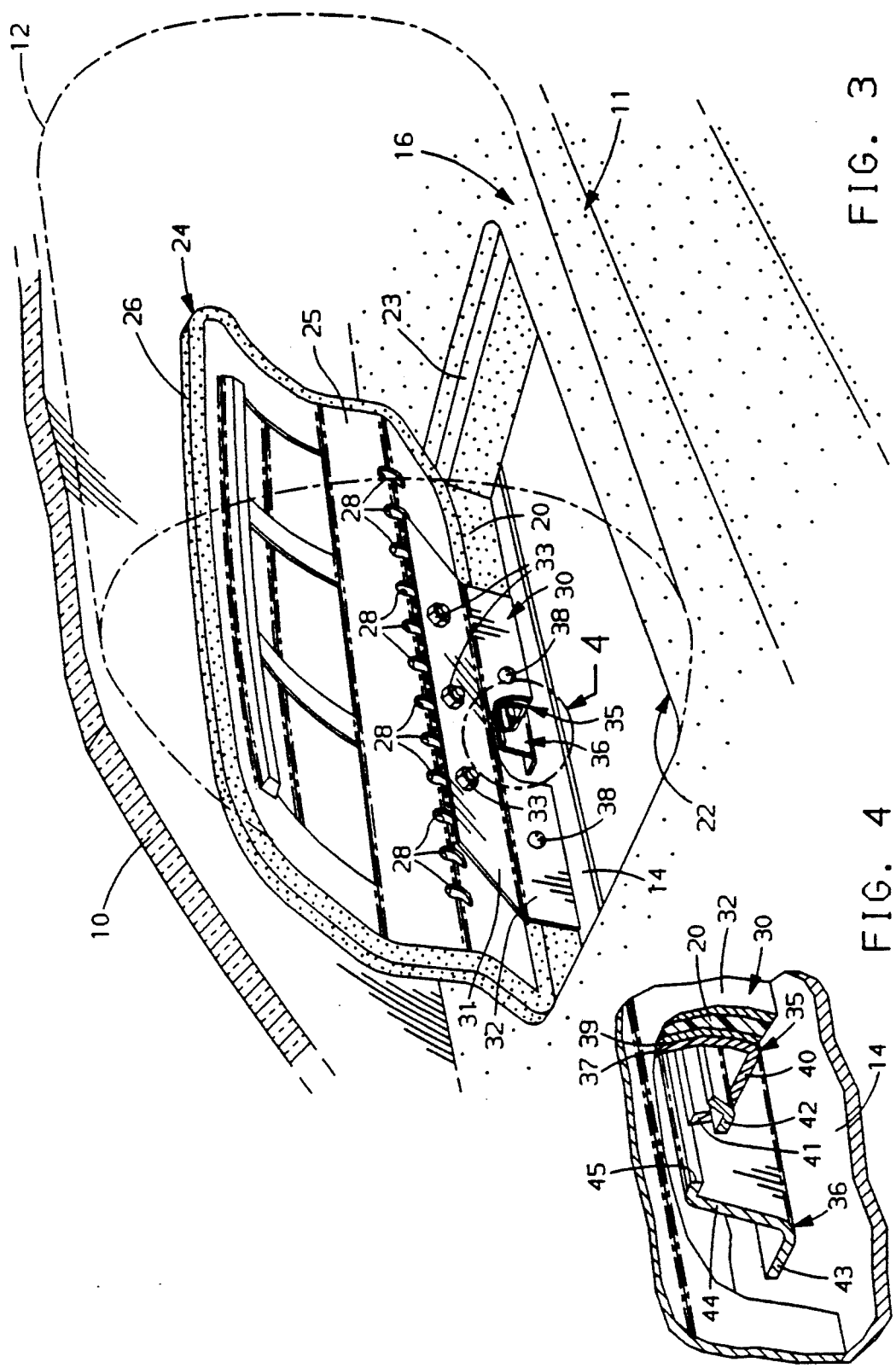
FIG. 3 is a perspective view corresponding to the positions in FIG. 2.
FIG. 4 is an enlarged portion of FIG. 3 showing the interconnection of the hinge elements.

Referring to FIGS. 1 and 3, it is seen that a vehicle includes a windshield 10 and an instrument panel assembly 11. As best shown in FIG. 1, the instrument panel assembly 11 includes sheet metal stampings 13, 14, and 15 which are suitably welded and fastened to form rigid underlying vehicle structure to support the instrument panel cover 11. The upper surface of the instrument panel assembly 11 is provided by an instrument panel cover 16 which is mounted on the rigid underlying vehicle structure formed by sheet metal stampings 13, 14 and 15. The instrument panel cover 16 includes a molded plastic base panel 17, a layer of decorative trim 18, and a cushion of foam 19 which is molded in place between the base panel 17 and the decorative trim 18.

The instrument panel cover 16 also has vent openings 21.

Referring to FIGS. 1 and 3, an inflatable air bag module 29 underlies the instrument panel assembly 11 and is supported by the rigid underlying vehicle structure denoted as sheet metal stampings 14 and 15. The instrument panel cover 16 has a rectangular opening 22 therein through which the inflatable air bag 12 is deployed to restrain the passenger side vehicle occupant. The opening 22 has a shelf 23 extending around its periphery and a molded plastic flange portion 20 of the base panel 17 extending downward from the periphery of the opening 22.

Referring to FIG. 1, an air bag deployment door 24 is molded into place in the instrument panel cover 16 to close the air bag opening 22. The door 24 is retained in the closed position by the angled peripheral edges of the door 24 resting upon the shelf 23 and being held in place by undercut edges defined around the opening 22 in the instrument panel cover 16. In addition, an adhesive or other releasable fastener may be employed to secure the door 24. The air bag deployment door 24 is comprised of a stamped sheet metal substrate panel 25 and a decorative trim cover 26 having a layer of foam 27 molded in place therebetween. As best shown in FIG. 3, the substrate panel 25 is generally rectangular in shape and underlies the entire extent of the door 24. FIG. 3 also shows a plurality of apertures 28 displayed in a row along the substrate panel 25 to weaken the door 24 in a manner which will permit bending of the door 24. For a detailed description of the door 24, refer to U.S. Patent application Ser. No. 07/835,890 filed Feb. 14, 1992, incorporated herein by reference.

As best seen in FIG. 1, a metal door strap 30 is attached to the underside of the door 24. The strap 30 is nearly L-shaped and includes a first leg 31 which extends to underlie the substrate panel 25 of the door 24, and a second leg 32 which extends downwardly from the first leg 31 and being parallel to and abutting the flange 20. The folded intersection of the first leg 31 and the second leg 32 forms a transversely extending bending axis about which the door strap 30 may bend, as will be discussed hereinafter. Additionally, the first leg 31 of the door strap 30 is attached to the substrate panel 25 of the door 24 by a plurality of fasteners 33.

As best shown in FIG. 1, a door hinge element 35 includes a mounting leg 37 which parallels the second leg 32 of the door strap 30 on the opposite side of the flange 20. A plurality of fasteners 38 connects the mounting leg 37 of the door hinge element 35 to the second leg 32 of the door strap 30 with the flange 20 and a steel reinforcement 39 interposed therebetween. The door hinge element 35 also includes an engaging leg 40 extending forwardly from the mounting leg 37. The engaging leg 40 includes a hooked tip portion 41 which turns upwardly from the forwardmost end of the engaging leg 40.

As best seen in FIG. 1, a vehicle hinge element 36 is S-shaped and includes an engaging leg 42, a vehicle leg 43 attached by a plurality of fasteners 46 to rigid underlying vehicle structure denoted as sheet metal stamping 14, and a vertical extending step 44 which connects the engaging leg 42 and the vehicle leg 43. The engaging leg 42 of the vehicle hinge element 36 extends between and is parallel to the instrument panel cover 16 and the engaging leg 40 of the door hinge element 35. As best seen in FIG. 4, the engaging leg 42 includes a centrally located aperture 45.

FIG. 1 shows the solid-line indicated closed position "A" of the door 24 as installed in the vehicle with the air bag 12 in the undeployed position. It will be appreciated that the deployment door 24 including the door strap 30, the steel reinforcement 39, the door hinge element 35 and fasteners 33 and 38 are all sub-assembled with the instrument panel cover 16, separately from the vehicle. It will also be appreciated that the vehicle hinge element 36 will be anchored to the rigid underlying vehicle structure denoted as sheet metal stamping 14 by fasteners 46 prior to installation of the instrument panel cover 16 into the vehicle. When the instrument panel cover 16 is installed in the vehicle, the engaging leg 40 of the door hinge element 35 is slid into place under the engaging leg 42 of vehicle hinge element 36, and accordingly no further access beneath the instrument panel cover 16 is required.

Thus, as can be seen in FIG. 1, the engaging leg 42 of the vehicle hinge element 36 extends to overlap and be spaced above and apart from the engaging leg 40 of the door hinge element 35 when the door 24 is in the closed position "A".

The phantom-line indicated position "B" of FIG. 1 shows the initial opening movement of the door 24 during initial deployment of the air bag 12. As the door 24 is rapidly lifted upward and forced out of the opening 22, the door 24 carries the engaging leg 40 of the door hinge element 35 into contact with the engaging leg 42 of the vehicle hinge element 36. More particularly, as can best be seen in FIG. 4, the hooked tip portion 41 of the engaging leg 40 of the door hinge element 35 is caught in the aperture 45 of the engaging leg 42 of the vehicle hinge element 36 causing these cooperating hinge-forming features 41 and 45 to form a hinged interconnection.

Figure 2:
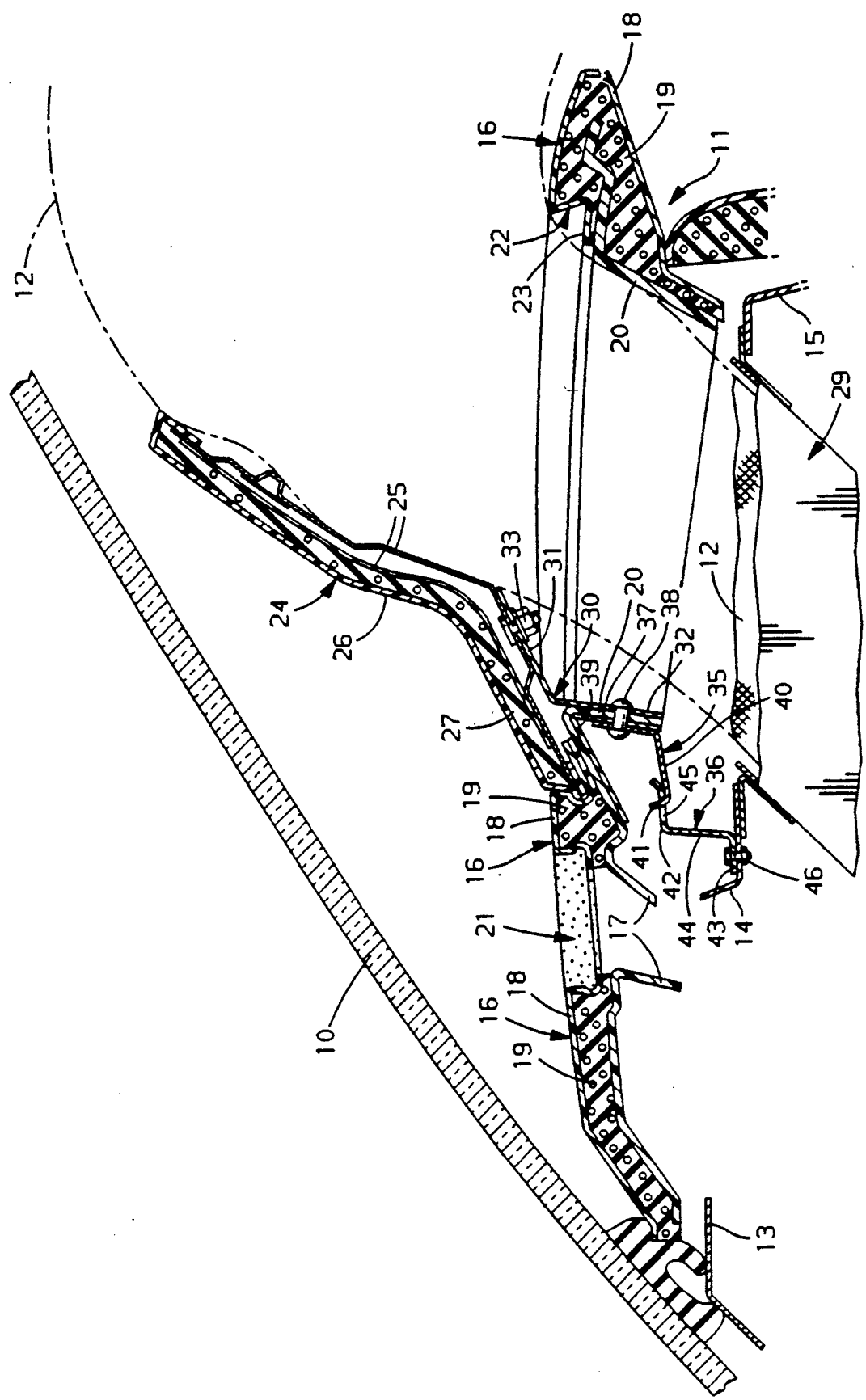
FIG. 2 is a section view through the same section as in FIG. 1 showing the air bag in the deployed position, the door in the open position and the hinge elements in the connected position.

FIGS. 2 and 3 show the air bag 12 in the deployed position and the door 24 in the open position. The hinged interconnection formed by the hinge elements 35 and 36 extending between the deployment door 24 and the rigid underlying vehicle structure denoted as sheet metal stamping 14 anchors the door 24 to the vehicle and limits further opening motion of the door 24 to rotation about a transversely extending hinge axis. In addition, the deployment door 24 will also bend about the bending axis formed by the folded intersection of the first leg 31 and second leg 32 of the door strap 30 upon further movement towards the open door position. As best shown in FIG. 2, movement of the door 24 to the open position is further permitted by flexing of the instrument panel cover 16 and the deployment door 24 as allowed by their plastic and foam construction.

Thus, it is seen that this embodiment of the invention provides a new and improved air bag deployment door hinge 35 and 36 extending between the door 24 and the vehicle structure which allows for sub-assembly of the instrument panel cover 16, the door 24, and the hinge 35 and 36, and yet provides a hinged interconnection and anchors the door 24 to the vehicle during air bag 12 deployment without requiring access underneath the instrument panel cover 16 to fasten the hinge 35 and 36 to the vehicle structure during installation into the vehicle.

Figure 5:
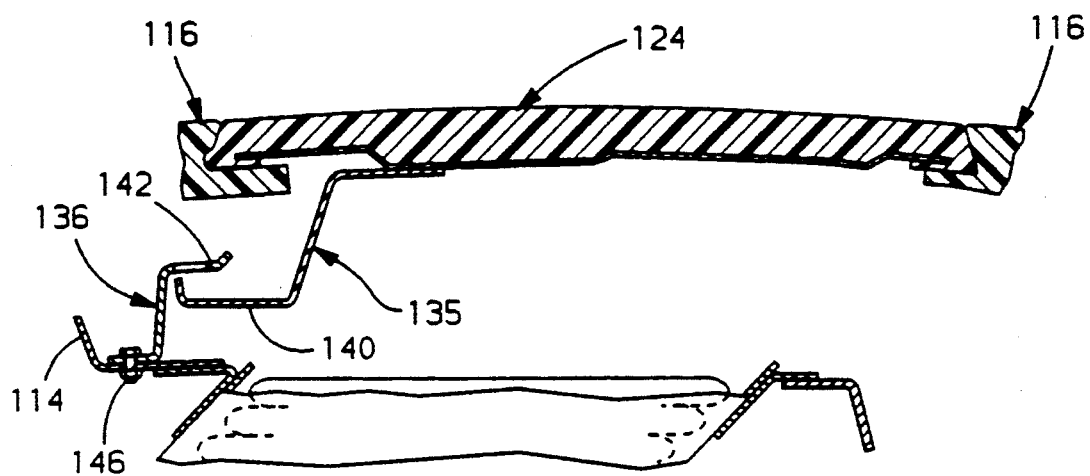
FIG. 5 is a schematic drawing of a section view similar to FIG. 1, but showing an alternative embodiment of the present invention.

Although the present invention has been described in considerable detail with reference to the preferred embodiment of FIGS. 1 through 4, other versions are possible. For example, FIG. 5 is a schematic showing an additional embodiment of this invention. As shown in FIG. 5, the door hinge element 135 is attached directly to the air bag deployment door 124 of the instrument panel cover 116. The vehicle hinge element 136 is attached by a plurality of fasteners 146 to the rigid underlying vehicle structure denoted as sheet metal stamping 114. The engaging leg 142 of the vehicle hinge element 136 is spaced above and apart from the engaging leg 140 of door hinge element 135 when the door 124 is in the closed position. Upon air bag deployment, the opening motion of the door 124 carries the engaging leg 140 of the door hinge element 135 upward to hingedly interconnect with the engaging leg 142 of the vehicle hinge element 136 thereby anchoring the door 124 to the vehicle. Further movement of the door 124 towards the open position is limited to rotation about a hinge axis defined by the hinge elements 135 and 136.

Figure 6:
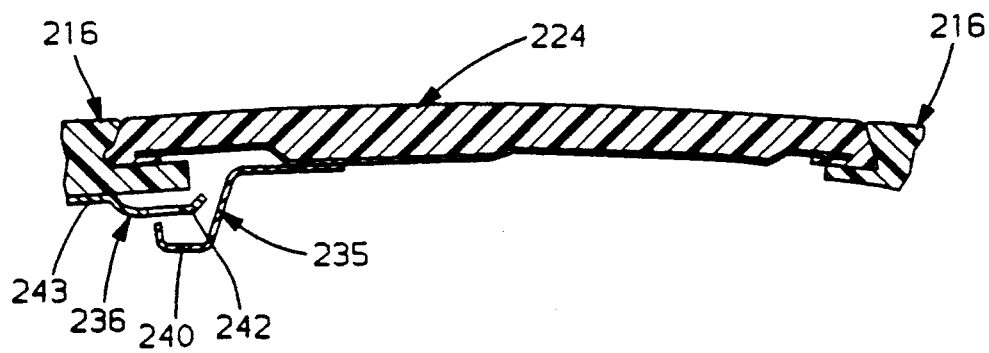
FIG. 6 is a schematic drawing of a section similar to FIG. 1, but showing another alternative embodiment of the present invention.

Additionally, FIG. 6 is a schematic showing another embodiment of this invention in which the vehicle leg 243 of the vehicle hinge element 236 is attached to the instrument panel cover 216. The door hinge element 235 is attached to the air bag deployment door 224. This embodiment has the advantage of enabling easy assembly of the door 224 into the vehicle, after installation of the instrument panel cover 216 into the vehicle, by sliding the engaging leg 240 of the door hinge element 23 under the engaging leg 242 of the vehicle hinge element 236. Thus, when the door 224 is in the closed position, the engaging leg 242 of the vehicle hinge element 236 is spaced above and apart from the engaging leg 240 of door hinge element 235. Upon air bag deployment, the opening motion of the door 224 carries the engaging leg 240 of the door hinge element 235 upward to hingedly interconnect with the engaging leg 242 of the vehicle hinge element 236 thereby anchoring the door 224 to the vehicle. Further movement of the door 224 towards the open position is limited to rotation about a hinge axis defined by the hinge elements 235 and 236.

Thus, as shown in FIGS. 5 and 6, it is apparent that the vehicle hinge element may be attached to either the instrument panel cover and or the vehicle structure underlying the instrument panel cover as long as the vehicle hinge element is supported to anchor the door to the vehicle during air bag deployment. In addition, FIGS. 5 and 6 illustrate that the door hinge element may extend directly between the deployment door and the vehicle hinge element.

It will be understood that a person skilled in the art may make modifications to the preferred embodiment shown herein within the scope and intent of the claims. Referring to FIG. 1, for example, the hooked tip portion 41 of the door hinge element 35 and the aperture 45 of the vehicle hinge element 36 may be interchanged so that the door hinge element 35 is apertured and the vehicle hinge element 36 is hooked. Furthermore, although the preferred embodiment shows the hooked tip portion 41 of the door hinge element 35 and the aperture 45 of the vehicle hinge element 36 acting as cooperating hinge-forming features, it will be understood that any other hinge-forming features are equally applicable. The preferred embodiment shows an L-shaped door hinge element 35 and an S-shaped vehicle hinge element 36. It will be understood that these are merely illustrative, and that the hinge elements 35 and 36 may assume other geometries depending on the location of the deployment door 24 in relation to the vehicle structure. Additionally, the preferred embodiment shows the hinge 35 and 36 being used with an air bag deployment door 24 closing an opening 22 in an instrument panel cover 16. It will further be understood that the hinge may also be used with a deployment door closing an air bag deployment opening in other vehicle locations, such as a door panel cover or a rear seat back panel cover. Therefore, the spirit and scope of the claims should not be limited to the description of the preferred embodiments contained herein.

The embodiments of the invention in which an exclusive property or privilege is claimed are defined as follows:

1. In a vehicle having a cover with an opening through which an air bag is deployed, and a door closing the opening and being forcibly moved out of the opening from a closed position towards an open position by the deploying air bag, the improvement comprising:
   a door hinge element carried by the door,
   a vehicle hinge element carried by the vehicle, said hinge elements having cooperating hinge-forming features spaced apart from one another when the door is in the closed position and said door hinge element being carried by the door into engagement with said vehicle hinge element causing the cooperating hinge-forming features to hingedly interconnect and anchor the door to the vehicle whereby further movement of the door towards the open position is limited to the door rotating about an axis defined by said hinge elements.

2. In a vehicle having a cover with an opening through which an air bag is deployed, and a door closing the opening and being forcibly moved out of the opening from a closed position towards an open position by the deploying air bag, the improvement comprising:
   a door strap carried by the door having a first leg underlying and attached to the door and a second leg extending from the first leg, said door strap being bendable about a bending axis defined by the folded intersection of said first and second legs,
   a door hinge element carried by the second leg of the door strap,
   a vehicle hinge element carried by the vehicle, said hinge elements having cooperating hinge-forming features spaced apart from one another when the door is in the closed position and upon air bag deployment the door being forcibly moved from the closed position towards the open position carries said door hinge element into engagement with said vehicle hinge element causing the cooperating hinge-forming features to hingedly interconnect and anchor the door to the vehicle whereby further movement of the door towards the open position is limited to the door rotating about an axis defined by said hinge elements and bending about an axis defined by said door strap.

3. In a vehicle having a cover with an opening through which an air bag is deployed and a door closing the opening and being forcibly moved out of the opening from a closed position towards an open position by the deploying air bag, the improvement comprising:
   a door hinge element having a mounting leg attached to the door and an engaging leg extending from the mounting leg,
   a vehicle hinge element having a vehicle leg attached to the vehicle and an engaging leg extending from the vehicle leg, said engaging leg of the vehicle hinge element overlapping and spaced above said engaging leg of the door hinge element when the door is in the closed position,
one of said engaging legs having an aperture and the other having a hook,
whereby upon air bag deployment said engaging leg of the door hinge element being carried by the door into engagement with said engaging leg of the vehicle hinge element causes said engaging legs to hingedly interconnect and anchor the door to the vehicle limiting further movement of the door towards the open position to rotation about an axis defined by said hinge elements.

* * * * *